United States Patent [19]

Mimura et al.

[11] Patent Number: 4,825,291
[45] Date of Patent: Apr. 25, 1989

[54] SOLID-STATE TELEVISON CAMERA WITH STORAGE TIME CONTROLLER

[75] Inventors: Itaru Mimura, Hachioji; Kazuhiro Sato, Setagaya; Toshiyuki Akiyama, Tokorozawa; Naoki Ozawa, Kokubunji; Koji Kudo, Hachioji; Kenji Takahashi, Tsukui; Yoshizumi Eto, Sagamihara, all of Japan

[73] Assignee: Hitachi, Ltd., Tokyo, Japan

[21] Appl. No.: 108,827

[22] PCT Filed: Jan. 21, 1987

[86] PCT No.: PCT/JP87/00034
§ 371 Date: Sep. 24, 1987
§ 102(e) Date: Sep. 24, 1987

[87] PCT Pub. No.: WO87/04581
PCT Pub. Date: Jul. 30, 1987

[30] Foreign Application Priority Data

Jan. 24, 1986 [JP] Japan ................................ 61-12126
Mar. 10, 1986 [JP] Japan ................................ 61-50370
Aug. 13, 1986 [JP] Japan ............................... 61-188441
Aug. 13, 1986 [JP] Japan ............................... 61-188437

[51] Int. Cl.⁴ .......................... H04N 5/30; G03B 7/08
[52] U.S. Cl. .............................. 358/213.19; 358/105; 250/201
[58] Field of Search ...................... 358/213.13, 213.19, 358/105; 250/201, 201 AF, 201 DF, 201 PF

[56] References Cited

U.S. PATENT DOCUMENTS 4,064,533 12/1977 Lampe et al. ..................... 358/105
4,218,119  8/1980 Schickedanz ..................... 250/201
4,527,053  7/1985 Kinoshita et al. ............. 250/201 PF
4,686,572  8/1987 Takatsu ......................... 358/213.13

Primary Examiner—Jin F. Ng
Assistant Examiner—Stephen Brinich
Attorney, Agent, or Firm—Antonelli, Terry & Wands

[57] ABSTRACT

This invention relates to a television camera and more particularly to a solid-state television camera using a solid-state image pickup device. The object of the invention is to provide a solid-state television camera which is devoid of drop of dynamic resolution for a moving object and provides high S/N for a still object. The solid-state television camera of this invention is equipped with pixels 3 from which signals are read out with a predetermined signal storage time, means 21 for detecting motion of an object from the signals of the pixels 3, and pixels 4 from which the signals are read out in the signal storage time in accordance with the detection signal of the detection means 21 and outputting video signals. The present invention can obtain video signals free from the drop of dynamic resolution for a moving picture and video signals having high S/N for a still picture. As a result, the invention can provide a television camera having excellent picture quality as a whole.

13 Claims, 18 Drawing Sheets

PULSES 56'

PULSES 55'

PULSES 65 GENERATED BY VERTICAL SHIFT REGISTER 33'

PULSES 66 GENERATED BY VERTICAL SHIFT REGISTER 33

SERIAL NUMBERS OF FIELDS: $f_1$, $f_2$, $f_3$, $f_4$

SIGNAL $S_n'$: $S_1'$, $S_2'$, $S_3'$, $S_4'$

SIGNAL $S_n$: $S_1$, $S_4$

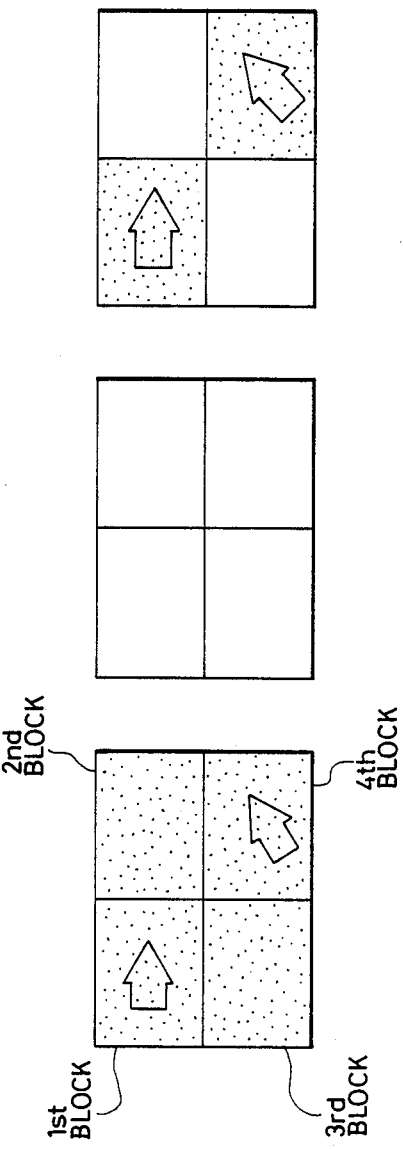

SOLID-STATE TELEVISON CAMERA WITH STORAGE TIME CONTROLLER

DESCRIPTION

TECHNICAL FIELD

This invention relates generally to a television camera, and more particularly to a solid-state television camera using a solid-state imaging device.

BACKGROUND ART

Present television cameras produce an optical image of an object on the imaging area of a charge integration type image pickup tube or a solid-state imaging device and scan the signal charge developed on this imaging area at a predetermined frequency to convert it to an electrical signal. This scanning frequency is predetermined in accordance with the television system employed, and is 60 fields/sec in the NTSC system, for example. Therefore, the signal storage time is 16.7 msec (in the case of signal readout with field storage) or 33.3 msec (in the case of signal readout with frame storage).

Solid-state imaging devices put into practical application as television cameras of the kind described above include an MOS type device and a CCD type device. These devices convert the optical image to signal charges using photoelements (e.g. photo-diodes) formed on a semiconductor substrate, store the signal charges, read out the signal charges at a predetermined frequency by a scanning circuit or the like and output video signals. In the charge integration type solid-state imaging device which stores the signal charges in the parasitic capacity of the photoelement (photo-diode), the sum of signal charges that can be stored (saturated signal charge) is determined to a predetermined value by the parasitic capacity of each photoelement.

On the other hand, the quantity of signal charge stored in each photoelement is proportional to the product of a signal storage time of each photoelement and the intensity of rays of light incident on each photoelement (or scene illuminance). Therefore, the quantity of signal charge stored in the photoelement becomes great when the signal storage time is long or when the object is bright and the intensity of incident rays is high, and becomes small when the signal storage time is short or when the object is dark and the intensity of incident rays of light is low, on the contrary. Since substantially constant noise charge mixes in the signal charge read out from the photoelement, the signal-to-noise ratio (S/N) of the imaging device is proportional to the quantity of signal charge stored in the photoelement. In other words, S/N changes depending on the signal storage time and the intensity of incident rays (scene illuminance). For instance, S/N can be improved by about 6 dB if the signal storage time is doubled or the intensity of incident rays is doubled.

In order to improve the S/N of the imaging device on the basis of the principle described above, the following prior art references attempt to control the signal storage time in accordance with the intensity of incident rays (scene illuminance):

(a) Japanese Patent Laid-Open No. 140,510/1976
(b) Japanese Patent Laid-Open No. 110,209/1980
(c) Japanese Patent Laid-Open No. 64,711/1982
(d) Japanese Patent Laid-Open No. 196,666/1984
(e) Japanese Patent Laid-Open No. 74,878/1985

These prior art references relate to a charge integration type photodetector used in an automatic focus detector of a camera or the like, and can set arbitrarily the storage time of the signal charge in accordance with the intensity of incident rays (scene illuminance). However, in the television camera to which the present invention is directed, the scanning frequency is fixed to 60 fields/sec. Therefore, the maximum storage time of the signal charge is 1/60 sec (16.7 msec) in the system employing signal readout with field storage and at most 1/30 sec (33.3 msec) in the system employing signal readout with frame storage. For this reason, when an object having low illuminance with low intensity of incident rays is imaged, the maximum storage time is fixed to either 1/60 sec (16.7 msec) or 1/30 sec (33.3 msec) even when one attempts to extend the storage time in order to improve S/N. Accordingly, degradation of image quality due to the drop of S/N is unavoidable.

Moreover, the prior art technique described above controls the storage time only through the intensity of incident rays (scene illuminance) but does not at all take moving objects into consideration. In other words, these references do not mention at all the drop (obscurity of image) of dynamic resolution of moving pictures that occurs with the increase in the storage time. Disclosure of Invention:

It is therefore an object of the present invention to provide a solid-state television camera which is devoid of the drop of dynamic resolution for moving objects and provides high S/N for still objects.

The solid-state television camera in accordance with the present invention includes a first group of photoelements for storing the signal charge in accordance with scene illuminance, a second group of photoelements for storing the signal charge in accordance with the scene illuminance, motion detection means for detecting the motion of an object on the basis of the signals from said first group, and storage time control means for controlling the storage time (scanning frequency) of said second group on the basis of the signals from the motion detection means.

In accordance with the present invention, the drop of dynamic resolution is unlikely to occur in motion pictures because the storage time is short, and S/N becomes high in still pictures because the storage time becomes long. Thus, the invention can effectively control dynamic resolution as well as S/N and can obtain video signals having high picture quality.

BRIEF DESCRIPTION OF DRAWINGS

FIGS. 22A–22C explain signal processing for each block;

BEST MODE FOR CARRYING OUT THE INVENTION

Hereinafter, preferred embodiments of the present invention will be described in detail with reference to the accompanying drawings.

Figure 1:
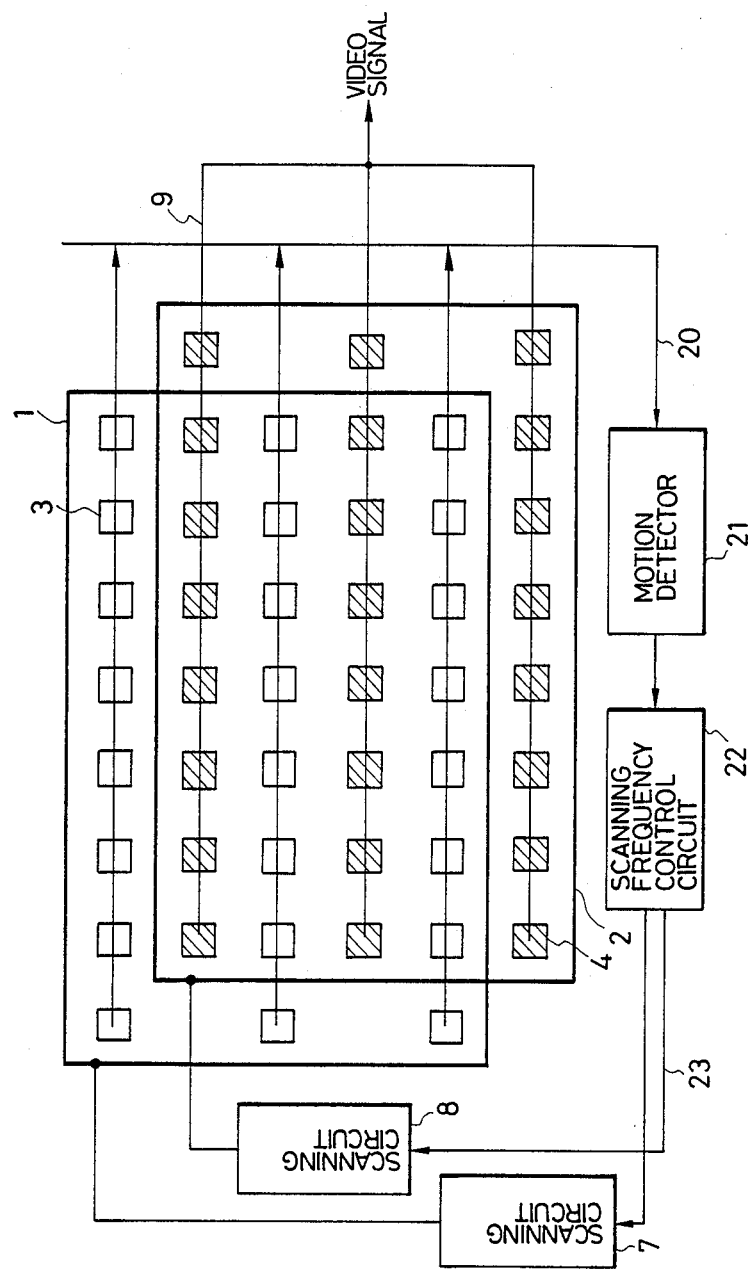
FIG. 1 is a block diagram showing schematically the present invention.

FIG. 1 shows the outline of the present invention. In this embodiment, an image pickup device consists of a solid-state imager 1 and a solid-state imager 2 which is superposed with the former with its pixels being deviated from the pixels of the former.

The solid-state imager 1 has a plurality of photoelements that store signal charges in accordance with the illuminance of an object (scene illuminance) and are arranged in a matrix. Each photoelement 3 is a pixel (motion monitor pixel) for detecting the motion of the object. Similarly, the solid-state imager 2 has photoelement 4 arranged in matrix. Each photoelement is a pixel (signal storage pixel) capable of freely changing the storage time of the signal charge by a scanning circuit 8. A scanning circuit 7 scans the solid-state imager 1 while another scanning circuit 8 scans the solid-state imager 2. The signal charge of the solid-state imager 2 scanned by the scanning circuit 8 is outputted as a video signal through a signal line 9. The signal charge of the solid-state imager 1 scanned by the scanning circuit 7 is inputted to a motion detector 21 through a signal line 20. The motion detector 21 judges whether the object is a motion picture or a still picture on the basis of the signal from the solid-state imager 1 and outputs its results. The signal of this motion detector 21 is inputted to a scanning frequency control circuit 22. The scanning frequency control circuit 22 controls the scanning frequency of the scanning circuit 8 by the signal from the motion detector 21. In this manner, the signal storage time of the solid-state imager 2 is controlled.

Incidentally, the embodiment shown in FIG. 1 represents the two solid-state imagers 1, 2 that are superposed with each other and equipped with respective photoelement groups of their own, in order to clearly show the motion monitor pixels 3 and the signal storage pixels 4. However, since the motion monitor pixel 3 and the signal storage pixel 4 may be the same, in principle, part of a plurality of photoelement formed on one solid-state imager may be used as the motion monitor pixels. From the aspect of practical application, the photoelement 4 for the signal storage pixel has preferably large storage capacity.

Figure 2:
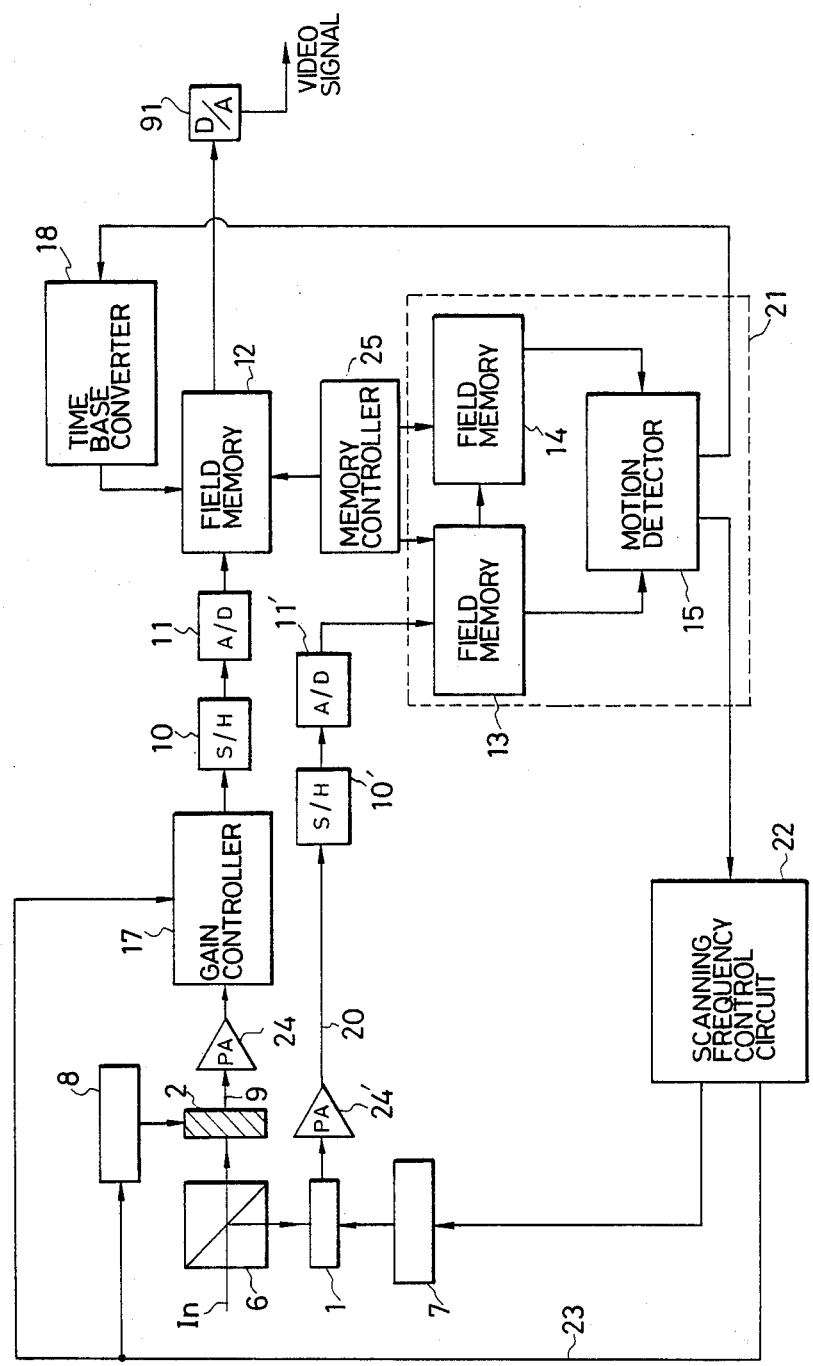
FIG. 2 is a block diagram showing the overall construction of the solid-state television camera in accordance with one embodiment of the present invention.

FIG. 2 shows the overall construction of the solid-state television camera in accordance with the present invention. In this drawing, like reference numerals are used to identify like constituents as in FIG. 1. The incident rays of light In from the object are incident to a beam splitter 6 and their components are divided into two directions and received by the solid-state imager 1 and 2, respectively. The signal from the solid-state imager 2 is inputted to a gain controller 17 through a pre-amplifier 24. The gain controller 17 controls the output level in accordance with the change of the storage time. After being controlled in the gain controller 17, the signal is stored in a field memory 12 through a sample-and-hold circuit 10 and an analog-to-digital converter (A/D convertor) 11. The signal stored in the field memory 12 is read out in synchronism with the signal of a time base convertor 18 and outputted as a video signal through a digital-to-analog convertor (D/A convertor) 91. On the other hand, the signal of the solid-state imager 1 is stored in a field memory 13 inside the motion detector 21 through a preamplifier 24', a sample-and-hold circuit 10' and an A/D convertor 11'. The signal stored in the field memory 13 is transferred to a field memory 14 for each field and stored therein. In other words, the field memory 14 stores the signal of one previous field. A motion detector 15 detects the correlation between the signals of the field memories 13 and 14 and judges whether or not the object is moving. The result of judgement by the motion detector 15 is outputted to the time base convertor 18 and to the scanning frequency controller 22. The scanning frequency controller 22 controls the scanning circuit 8 and the gain controller 17 in accordance with the result of judgement by the motion detector 15. Each of the field memories 12, 13 and 14 is controlled by a memory controller 25.

Figure 3:
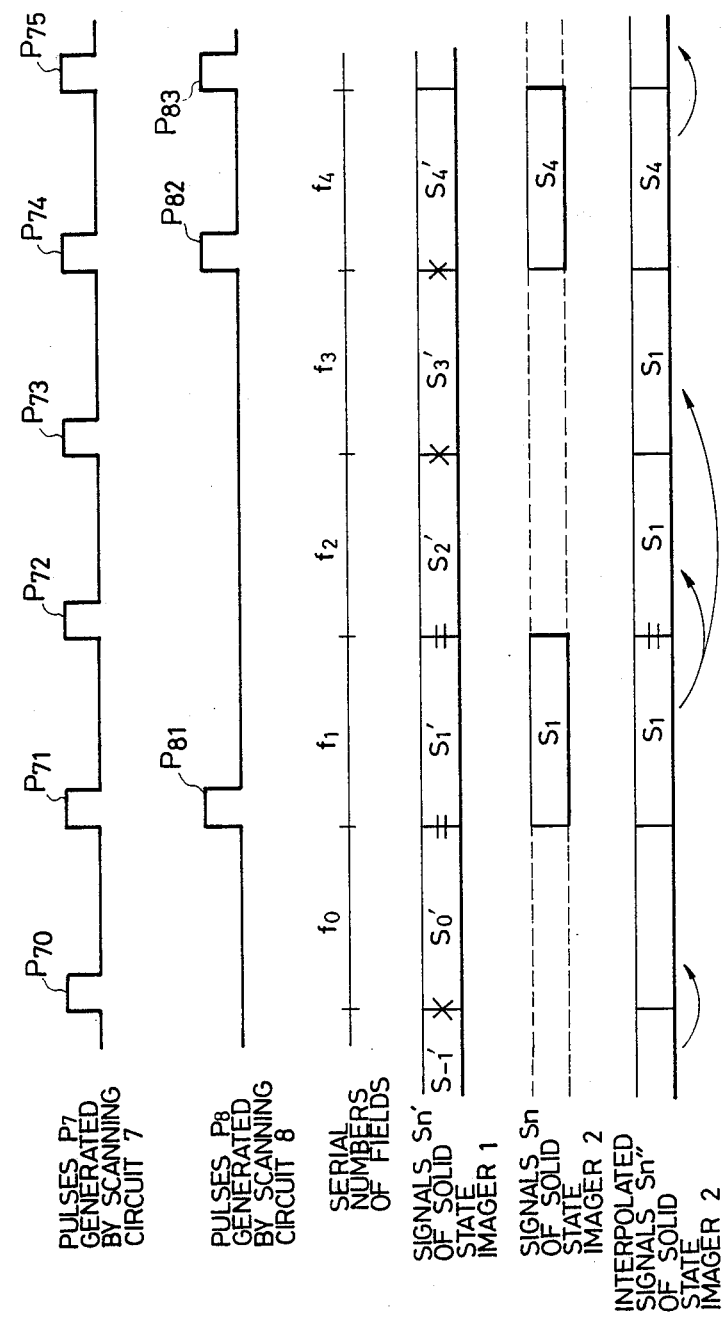
FIG. 3 is a timing chart useful for explaining the operation of FIG. 2.

FIG. 3 is a time chart which is useful for explaining the operation of the circuit shown in FIG. 2. Hereinafter, the operation of the embodiment shown in FIG. 2 will be explained with reference to FIG. 3.

FIG. 3 shows the case where the signals are stored for a three-field period. The scanning circuit 7 outputs scan-start-pulse $P_7$ ($P_{70}$, $P_{71}$, $P_{72}$, $P_{73}$, ...) for the solid-state imager 1 at a predetermined frequency (60 Hz). A signal $S_0'$, $S_1'$, $S_2'$, $S_3'$, $S_4'$, ... is produced from the solid-state imager 1 for each field by the scan-start-pulse $P_7$. The motion detector 21 judges the motion of the object from these signals $S_0'$ through $S_4'$ and so forth.

It will be now assumed that a motion judgement signal $S_1'$ and the signal $S_1$ from the solid-state imager 2, which has a long storage time and high S/N, are obtained at the field $f_1$. At this time, the level of the signal $S_1$ is controlled by the gain controller 17 and the signal is then stored in the field memory 12 through the sample-and-hold circuit 10 and the A/D convertor 11. At the same time, the signal of the field memory 13 is transferred to the field memory 14.

Motion judgement is made by the signal $S_{-1}'$ of the solid-state imager 1 of one previous field in the field memory 14 and the signal $S_0'$ of the present field in the field memory 13. In other words, the motion detector 15 determines the correlation of the signals of the two fields and judges the object as a still object if the correlation is high and as a moving object if the correlation is low.

Incidentally, the correlation described above is established by, for example, accumulating difference signals between pixels corresponding to one another with respect to positions. In this embodiment, the correlation is high between the signals $S_0'$, $S_1'$ and $S_2'$ but is low between the signals $S_2'$ and $S_3'$. Accordingly, the solid-state imager 2 accumulates the signals for three-field periods ($f_1$, $f_2$, $f_3$).

Since the correlation between the signal $S_2'$ and $S_3'$ is low in the field $f_3$, the object is judged as the moving object and the scanning frequency control circuit 22 generates the scan-start-pulse $P_{82}$ and reads out a signal $S_4$. The read-out operation described above provides the signal Sn of the solid-state imager 2. The signal of the signal storage pixel 4 cannot be obtained in the fields $f_2$, $f_3$ when the signal storage pixel 4 stores the signal. During this period the signal stored in the field memory 12 is used repeatedly in order to make interpolation and to obtain the signal Sn".

Figure 4:
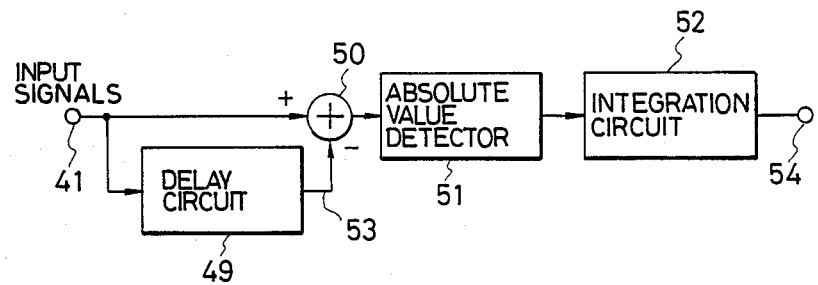
FIG. 4 is a block diagram showing another example of the motion detector 21 shown in FIG. 2.

FIG. 4 shows another example of the motion detector 21 shown in FIG. 2. The motion detector 21 in this drawing consists of a delay circuit 49, a differential value detector 50, an absolute value detector 51 and an integration circuit 52. The delay time of the delay circuit 49 corresponds to one field period. The correlation between the fields is obtained by determining the difference between the output signal 53 of the delay circuit 49 and the original signal 41 by the differential value detector 50. The absolute value of the difference signal thus obtained is determined by the absolute value detector 51 and its accumulation value is determined by the integration circuit 52. In the operation of this circuit, a large accumulation value appears at the output terminal 54 if the object is moving and has low correlation, and a small accumulation value appears if the object is still and has high correlation.

Figure 5:
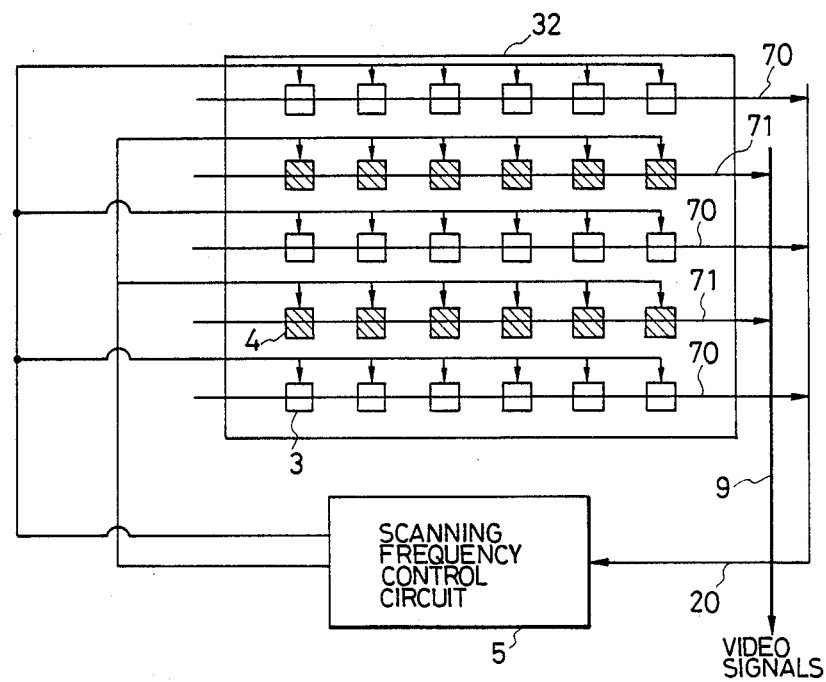
FIG. 5 is a block diagram showing the arrangement wherein motion monitor pixels and signal storage pixels are disposed on the same substrate.

FIG. 5 shows an embodiment wherein the motion monitor pixels 3 and the signal storage pixels 4 are arranged on one substrate. In this drawing, the scanning frequency control circuit 5 represents, as a whole, the motion detector 21, the scanning frequency control circuit 22 and the scanning circuits 7 and 8 shown in FIG. 1, and its construction is the same as that of the embodiment shown in FIG. 1. In FIG. 5, two kinds of signal lines, that is, signal lines 70 for picking up the signals from the motion monitor pixels 3 and signal lines 71 for picking up the signals from the signal storage pixels 4, are disposed on one solid-state imager 32.

Figure 6:
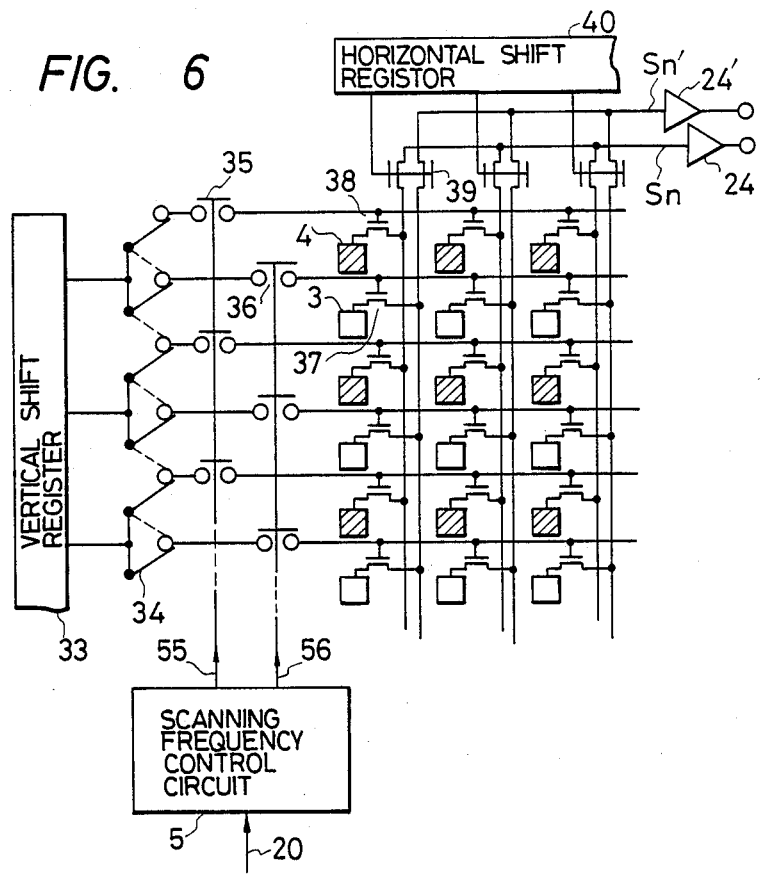
FIG. 6 shows an another embodiment wherein an solid-state imager is constituted by MOS type device.

Next, FIG. 6 shows an embodiment wherein the apparatus of the invention is constituted by MOS type imaging device.

In FIG. 6, scanning of each pixel is made by a vertical shift register 33 and a switch 34. Switches 35 and 36 are opened and closed by the scanning frequency control circuit 5 so as to control the storage time of the signal storage pixels 4. The switch 36, which is for controlling the motion monitor pixel 3, is kept closed during the scanning period of each field, so that the scanning pulse of the vertical shift register 33 moves and is transferred to the gate of a vertical MOS transistor 37 connected to the motion monitor pixel 3, and the signal charge is read out in all the fields.

The switch 35 is opened when the signal is to be stored in the signal storage pixel 4. When this switch 35 is opened (OFF, the scanning pulse of the vertical shift register 33 is not transmitted to the vertical MOS transistor 38 and the signal charge is stored in the signal storage pixel 4.

The switch 35 is closed when the signal is to be read out and the vertical scanning pulse is transferred to the vertical MOS transistor 38. Incidentally, a horizontal MOS transistor 39 and a horizontal shift register 40 are used in order to read out the signals in the horizontal direction.

Figure 7:
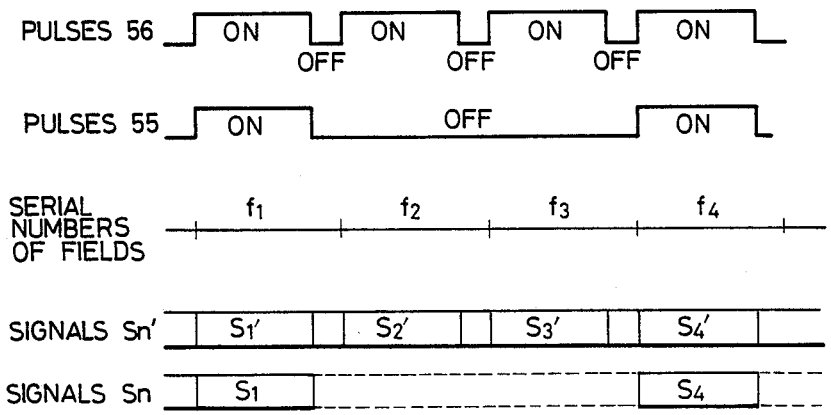
FIG. 7 is a timing chart useful for explaining the operation of FIG. 6.

FIG. 7 is a control timing chart for the switches 35 and 36 shown in FIG. 6. This time chart shows the case where the 3-field period signals are stored in the same way as in FIG. 3.

In FIG. 6, a pulse train 56 is control pulses for the switch 36 while a pulse train 55 are control pulses for the switch 35. The switch 36 is closed by the ON signal of the pulse train 56 and the signals $S_1'$, $S_2'$, $S_3'$, $S_4'$, ... are read out from the motion monitor pixels 3. The signals $S_1$, $S_4$, ... are read out from the signal storage pixels 4 by the ON signal of the pulse train 55. The signals are read out from the motion monitor pixels 3 for all the fields by the pulse train 56, but the signals are stored in the signal storage pixels 4 by the OFF signal of the pulse train 55 in the field periods $f_2$ and $f_3$.

The signal readout operation described above provides the signal Sn' and Sn and the signal $S_4$ that has been stored for the 3-field period can be obtained.

Figures 8, 9:
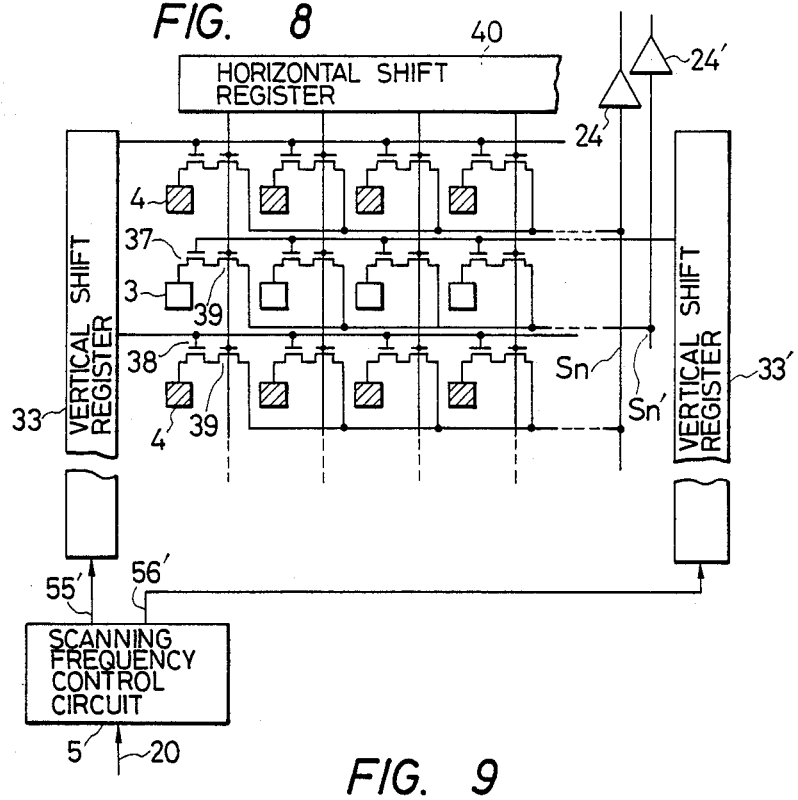
FIG. 8 shows another example of FIG. 5.
FIG. 9 is a timing chart useful for explaining the operation of FIG. 8.

FIG. 8 shows still another embodiment wherein the motion monitor pixels 3 and the signal storage pixels 4 are arranged on one substrate. In this embodiment, scanning of the motion monitor pixels 3 and the signal storage pixels 4 is made by two vertical shift registers 33 and 33'. In other words, the vertical MOS transistor 37 for scanning the motion monitor pixels 3 is opened and closed by the vertical shift register 33'. The vertical MOS transistor 38 of the signal storage pixels 4 is opened and closed by the vertical shift register 33. The vertical shift register 33' opens and closes the vertical MOS transistor 37 in a predetermined period, so that the signals are read out from the motion monitor pixels 3 in all the fields. On the other hand, the vertical shift register 33 operates in response to the signal 55' from the scanning frequency control circuit 5.

FIG. 9 shows a driving timing chart of the shift registers 33', 33 shown in FIG. 8. This drawing, too, shows the case where the signals are stored in the 3-field period in the same way as in FIG. 6.

In FIG. 9, a pulse train 56' is a scan-start-pulse of the shift register 33' while a pulse train 55' is a scan-startpulse of the shift register 33. The shift registers 33 and 33' are controlled by these pulses and the vertical scanpulse 65 and 66 open and close the vertical MOS transistors 37 and 38, thereby providing the signals Sn and Sn' in the same way as in FIG. 6.

Figure 10:
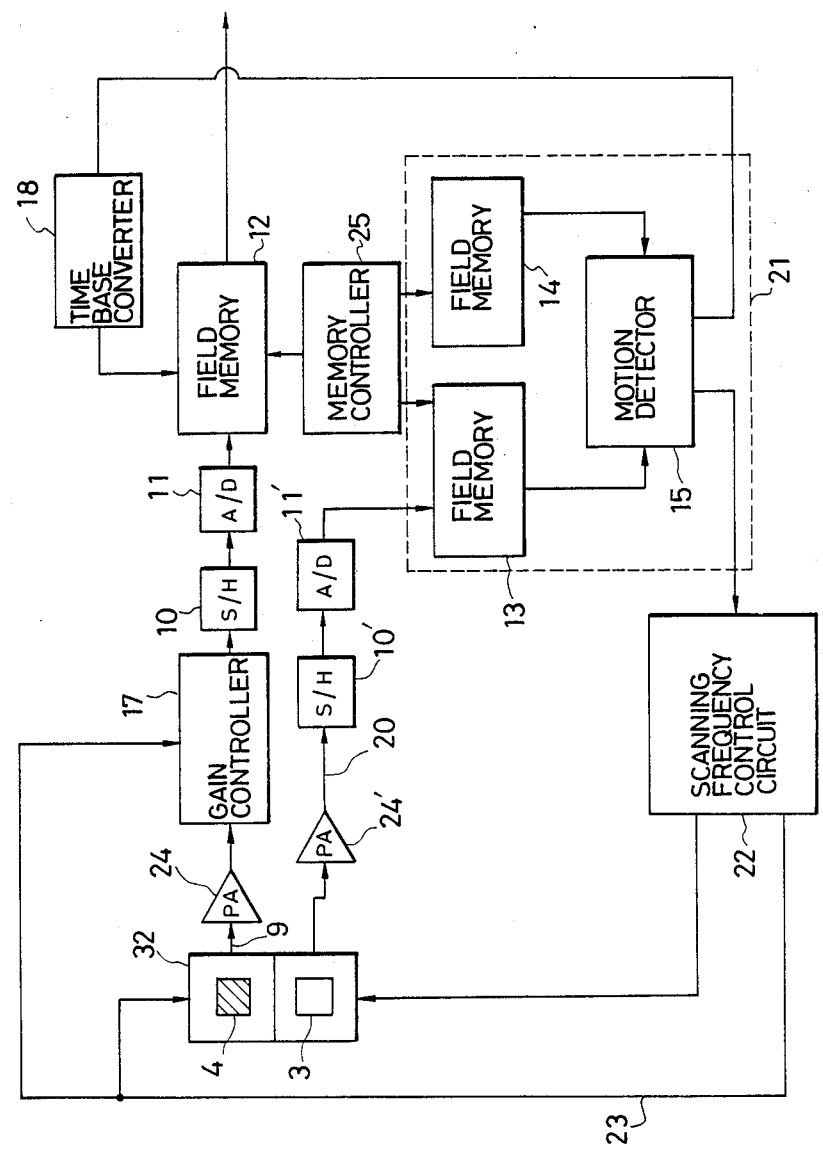
FIG. 10 is a block diagram showing the overall construction of a solid-state television camera using the imaging device shown in FIG. 5.

FIG. 10 shows an embodiment of the overall construction of a solid-state television camera using the solid-state imager shown in FIG. 5. This is a circuit for processing two kinds of signals obtained from the solid-state imager 32 and is substantially the same as the embodiment of the process circuit shown in FIG. 2.

Figure 11:
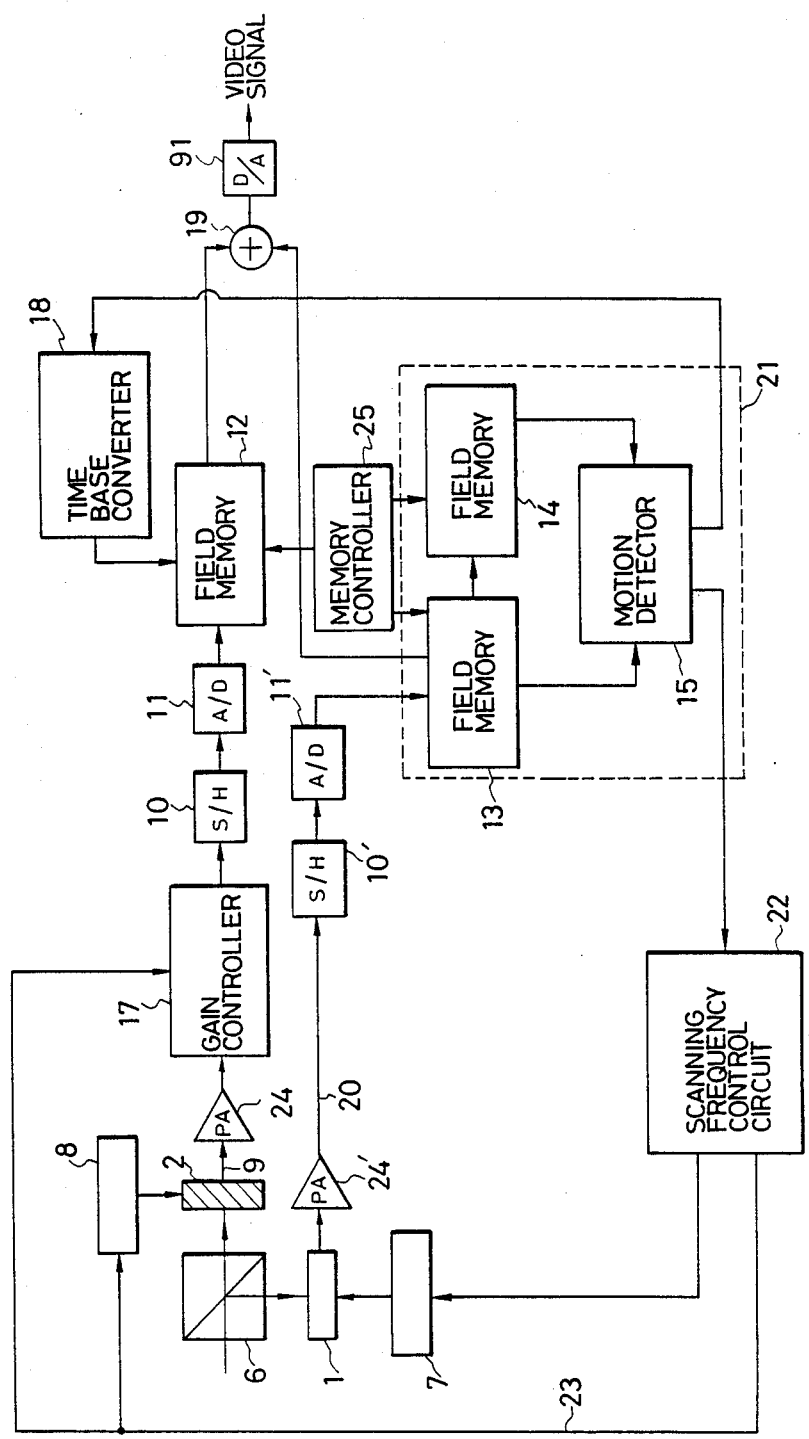
FIG. 11 shows a modified example of the embodiment shown in FIG. 2.

FIG. 11 shows a modified embodiment of the embodiment shown in FIG. 2. The difference from FIG. 2 lies in that the signal of the field memory 13 is used as the video signal. In other words, the video signal consists of a sum signal obtained by adding the signals of the field memories 12 and 13 by an adder 19. This modified embodiment can effectively utilize part of the incident rays of light that are used for monitoring.

Figure 12:
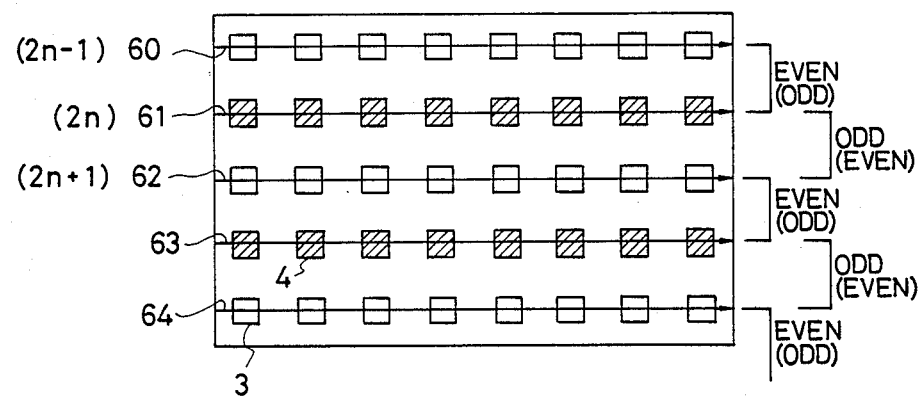
FIG. 12 is a timing chart useful for explaining the operation of FIG. 11.

FIG. 12 is a drawing for explaining the method of reading out the signals from the field memories 12 and 13 in the embodiment shown in FIG. 11.

In even-numbered (odd-numbered) fields, a scanning line signal 60 from the motion monitor pixels 3 in the memory 13 and the scanning line signal 61 from the memory 12 are simultaneously read out. These two signals of the scanning line signals 60 and 61 are mixed by the adder 19, thereby effecting simultaneous 2-line readout. Similarly, the next scanning line signal is obtained by combining the scanning lines 62 and 63 with each other. In the even-numbered (odd-numbered) fields, the scanning signals are obtained likewise by like combination. On the other hand, in the odd-numbered (even-numbered) fields, the combination of the scanning lines is changed or in other words, the scanning line signal is obtained by use of the signals of the scanning lines 61 and 62. The signal readout operation described above accomplishes interlaced scanning to obtain television signals.

Figure 13:
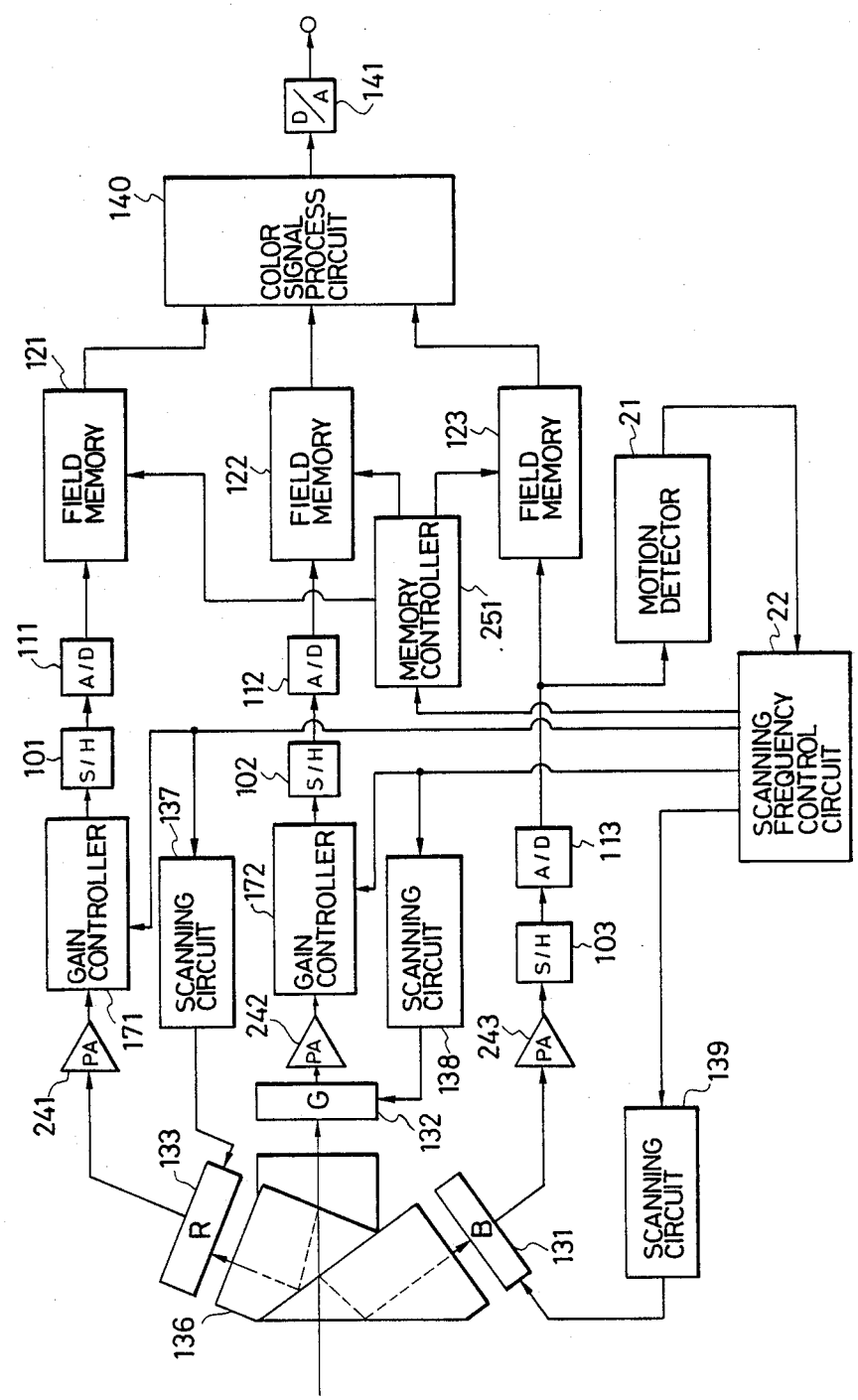
FIG. 13 is shows still another embodiment wherein the present invention is applied to a 3-chip color camera.

FIG. 13 shows an embodiment of a color television camera by use of three solid-state imager. To obtain color video signals, a dichroic prism 136, a red (R) imager 133, a green (G) imager 132, a blue (B) imager 131, a color signal process circuit (color encoder) 140 and scanning circuits 137, 138 and 139 are added to the camera.

This embodiment uses all the pixels of the blue (B) imager 131 as the monitor pixels. In other words, the blue (B) imager 131 is scanned at 60 fields/sec to obtain the signal and the motion of the object is detected by use of this signal. When the object is judged as the moving picture, the scanning frequency control circuit 22 controls the scanning circuits 137, 138 to read out the signals of the read (R) and green (G) imager. When the object is judged as still picture, on the other hand, the control signal is supplied to store the signals. The red (R), green (G) and blue (B) signals that are thus read out are once stored in the field memories 121, 122 and 123. After the field from which no signal is obtained is interpolated by the signals which are once stored in the field memories, these signals are inputted to the color signal process circuit (color encoder) 140 to obtain the color television signals.

In accordance with the color television camera described above, S/N of the red (R), and green (G) signals can be improved. Since the red (R) and green (G) signals are the principal components of the television signal, S/N of the luminance signal can be improved eventually. This camera is devoid of the drop of dynamic resolution for the moving object. This embodiment uses the signal of the blue (B) imager for monitoring because the blue (B) signal has low contribution to the luminance signal. Therefore, any of the red (R), green (G) and blue (B) signals may be used for this purpose.

Figure 14:
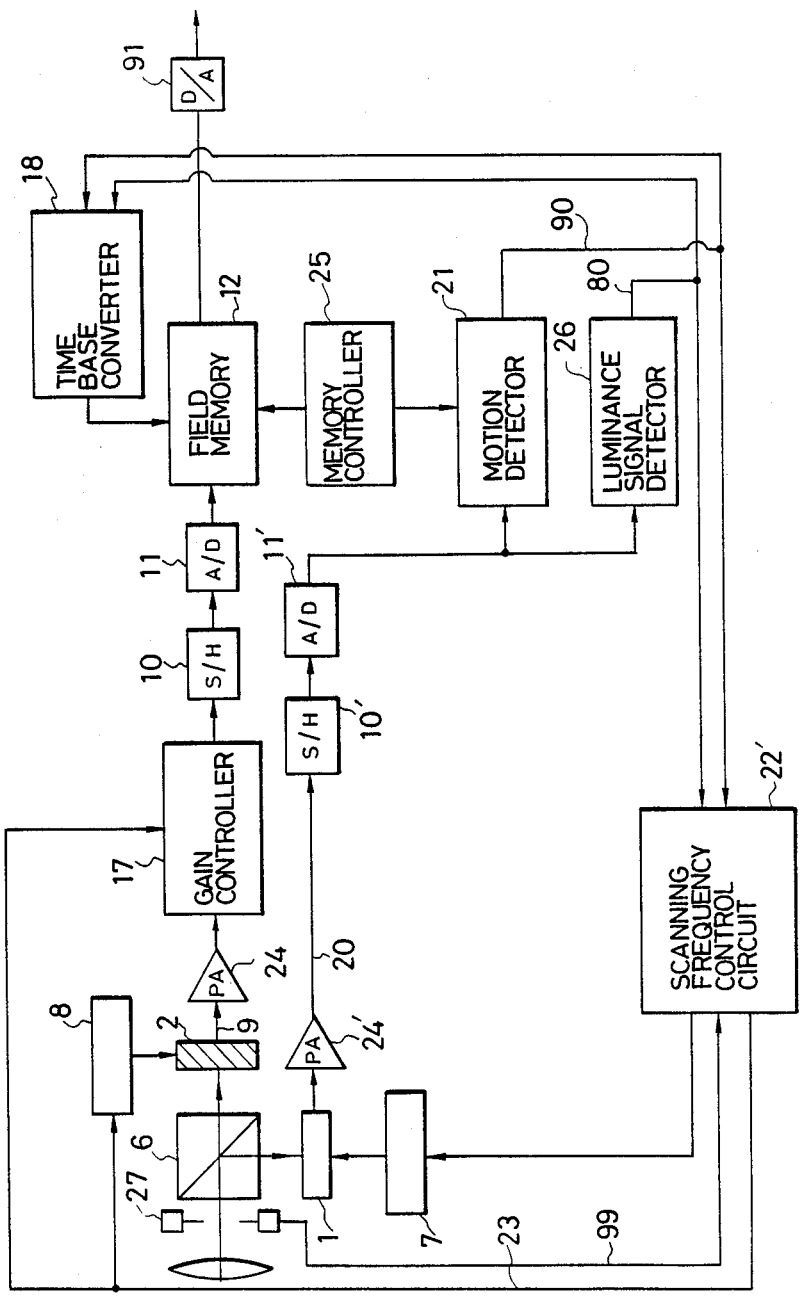
FIG. 14 shows a modified example of the embodiment shown in FIG. 2.

FIG. 14 shows another embodiment wherein a luminance signal detector is added to the embodiment shown in FIG. 2.

First of all, the relation between luminance and dynamic resolution of the television camera will be explained before the description of the embodiment of FIG. 14.

Figure 15A:
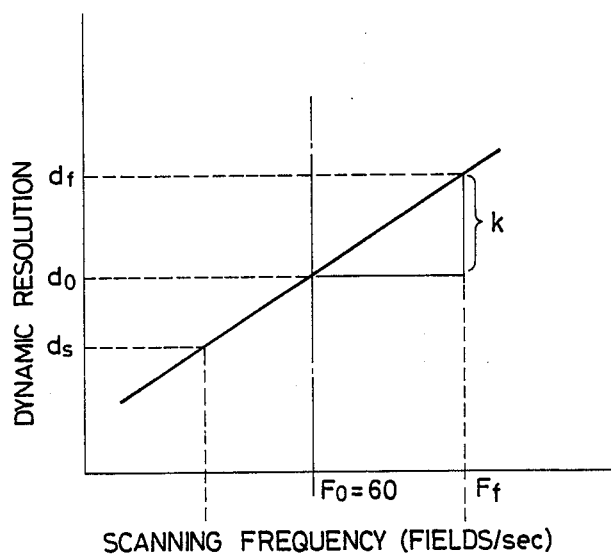
FIGS. 15A–15B show the relation between dynamic resolution and scanning frequency and between S/N and scanning frequency.
Figure 15:
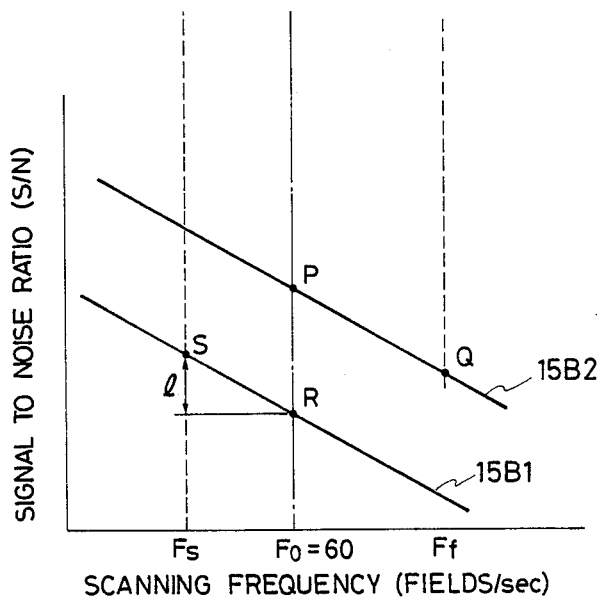

FIG. 15 shows the relation between the scanning frequency and dynamic resolution of the television camera and between the scanning frequency and S/N. FIG. 15(A) shows the change of dynamic resolution while FIG. 15(B) does that of S/N. Reference numeral 15B1 in FIG. 15(B) represents the case where an object having low illuminance while 15B2 represents the case where an object having high illuminance.

In the present television system (NTSC system) the scanning frequency is fixed to $F_0 = 60$ fields/sec. Therefore, dynamic resolution assumes a constant value $d_0$, but S/N changes with illuminance of the object as can be seen clearly from FIG. 15(B). In other words, S/N is at a point R when the object 15B1 has low illuminance and at a point P when the object 15B2 has high illuminance.

Therefore, the embodiment shown in FIG. 14 makes the scanning frequency variable and improves S/N for an object (low illuminance object 15B1) which is still, though it is dark, be extending the signal storage time. For instance, the scanning frequency is set to $F_s$ and S/N is brought to a point S. On the other hand, dynamic resolution is improved for a bright object (high illuminance object 15B2) by shortening the signal storage time. For instance, the scanning frequency is set to $F_f$ and dynamic resolution is brought to a point $d_f$. To take the image of the still object, dynamic resolution need not be high and the scanning frequency can be made low from $F_0$ (60 fields/sec) to the point $F_s$. In this case, S/N can be improved from the point R to the point S and the effect of improvement l of S/N due to signal accumulation can be obtained.

S/N of the television camera need not be improved infinitely so long as it satisfies a certain predetermined value from the aspect of visual characteristics of people. Therefore, in the case of the object which is sufficiently bright (high illuminance object 15B2), excessive S/N can be allotted to high speed scanning. In other words, where S/N is at the point P at the scanning frequency $F_0$ and S/N can be reduced to the value at the point Q, it becomes possible to raise the scanning frequency $F_0$ (60 fields/sec) to $F_f$. In this manner, dynamic resolution can be improved by k from do to $d_f$.

Incidentally, since practical image pickup devices have a limit of signal storage capacity, they cannot be used at illuminance exceeding a predetermined value. Therefore, they limit the incident rays of light by utilizing a lens stop or a lens iris. Since the signal charge of the image pickup device is proportional to the product of the light intensity and the storage time (inverse number of scanning frequency), the effect of the lens stop can be obtained by making the scanning frequency variable. When the object is bright (high illuminance object 15B2), the excessive intensity of the light that has been cut off by the lens stop can be substituted to dynamic resolution.

The embodiment satisfying the operation described above will be explained with reference to FIG. 14. In FIG. 14, the difference from FIG. 2 lies in that the signals from the luminance signal detector 26 and the lens stop 27 are inputted to the scanning frequency control circuit 22'. When brightness or illuminance of the object detected by use of the signal of the monitor pixel exceeds a reference value, S/N of the video signal is high. Therefore, the television camera of this embodiment raises the scanning frequency above 60 fields/sec to improve dynamic resolution when the object has high illuminance.

The scanning frequency control circuit 22' regards the object as being dark when the detected illuminance is not above the level of the reference value, and carries out the signal storage operation in order to improve S/N. When the intensity of incident rays of light to the solid-state imager increases and a signal having high S/N and large amplitude can be obtained, the scanning frequency of the signal storage pixel 4 is automatically sped up: Therefore, the signal storage time becomes shorter and the signal amplitude becomes smaller but dynamic resolution can be improved. At this time the scanning frequency is controlled in such a manner that the signal level obtained by one readout operation converges to the reference value.

The embodiment shown in FIG. 14 supervises simultaneously the condition of the lens stop 27, in order to prevent the problem in that when the lens stop 27 is opened, the intensity of the rays of light incident to the solid-state imager increases and the scanning frequency becomes automatically faster.

The gist of the present invention lies in that the excessive quantity of light that has been cut off conventionally by the lens stop 27 is substituted to dynamic resolution, and control is effected in such a manner as not to change the scanning frequency when the lens stop 27 is open above a set value.

As a result, only after the value of the lens stop 27 reaches the set value and the level of the detected signal exceeds a predetermined value, high speed scanning above 60 fields/sec can be attained.

Figure 16:
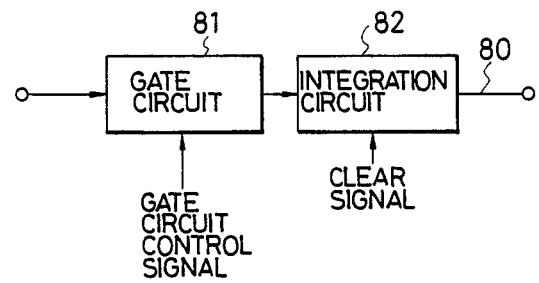
FIG. 16 is a block diagram showing a definite example of a luminance signal detector 26 shown in FIG. 14.

FIG. 16 shows a definite example of the luminance signal detector 26. The signal from the monitor pixel is inputted to an integration circuit 82 through a gate circuit 81. The gate circuit 81 determines at which portion of the imaging area illuminance is to be detected. It is opened and closed in synchronism with a vertical sync signal and a horizontal sync signal. To detect illuminance of the entire picture surface, for example, the time corresponding to that position is judged from the sync signal and the gate is opened to transmit the signal. The output signal from this gate circuit 81 is integrated by the integration circuit 82 to obtain the signal 80 having a magnitude corresponding to illuminance.

Figure 17:
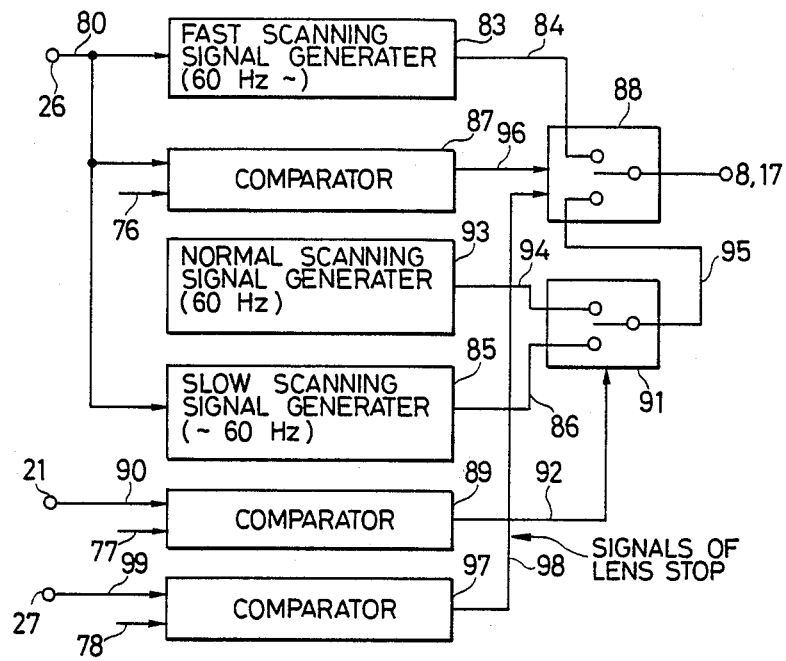
FIG. 17 is a block diagram showing a definite example of a scanning frequency control circuit 22' shown in FIG. 14.

FIG. 17 shows a definite example of the scanning frequency control circuit 22. A high speed scanning circuit 83 produces a high speed scanning signal 84 above 60 fields/sec on the basis of the illuminance signal 80 inputted thereto, while a low speed scanning circuit 85 produces a low speed scanning signal 86 below 60 fields/sec in accordance with the illuminance of the object. A comparator 87 compares the illuminance signal 80 with the reference value 76 while another comparator 97 compares a lens stop signal 99 with the reference value 78, and controls a selector 88 on the basis of the signals 96 and 98 obtained by these comparison operations. On the other hand, a comparator 89 compares a motion detection signal 90 with the reference value 77 and controls a selector 91. The selector 91 selects the scanning signal 94 of 60 fields/sec for the moving object and the low speed scanning signal 86 in accordance with the illuminance for the still object, on the basis of the signal 92 from the comparator 89. The selector 88 selects the high speed scanning signal 84 when illuminance is high and the lens stop exceeds the reference value (or when the lens is contracted), on the basis of the signals from the comparators 87 and 97. It selects the scanning signal 95 below 60 fields/sec when illuminance is low and the lens is near to the open state and below the reference value.

This circuit controls the storage time of the signal storage pixel 4 by producing the selected scanning signals described above.

Figure 18:
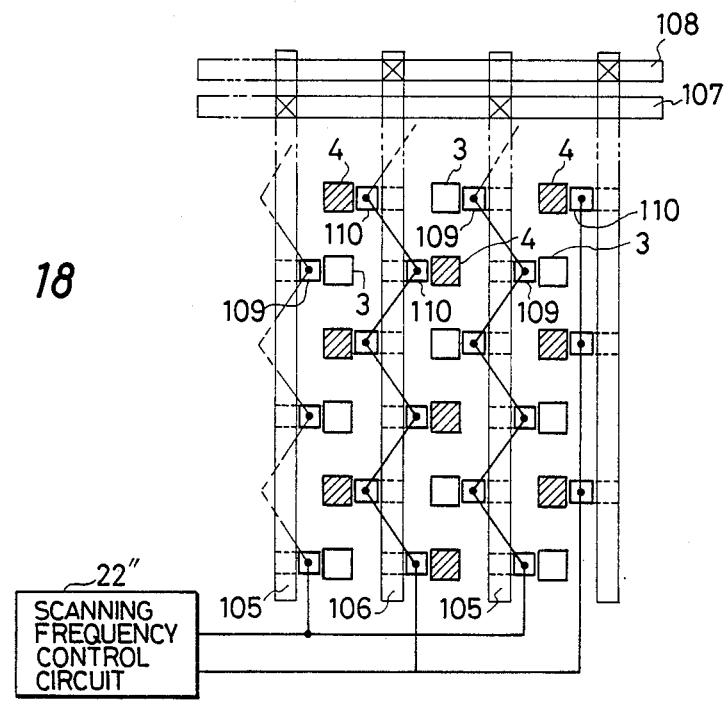
FIG. 18 shows an embodiment wherein the solid-state imager is constituted by CCD type device.

FIG. 18 shows an embodiment wherein the solid-state imager suitable for the present invention is constituted by CCD (Charge Coupled Device). Vertical CCD 105 for transferring the signal charge of the monitor pixel 3 in a vertical direction is connected to horizontal CCD 107 for transferring the signal charge in a horizontal direction. Vertical CCD 106 for the signal storage pixel 4 is connected to horizontal CCD 108.

The signal storage time is controlled by controlling the opening and closure of transfer gates 109, 110 disposed between the photoelement and vertical CCD by use of the scanning frequency control circuit 22''.

In the embodiment shown previously in FIG. 11, the signals of the signal storage pixel 4 and the monitor pixel 3 are added and outputted by the adder 19, but this embodiment uses a signal process circuit in place of the adder 19. In this signal process circuit the low frequency range is constituted by only the signals of the signal storage pixels 4 while the high frequency range is constituted by all the pixels (i.e. signal storage pixels 4 and monitor pixels 3).

Figure 19:
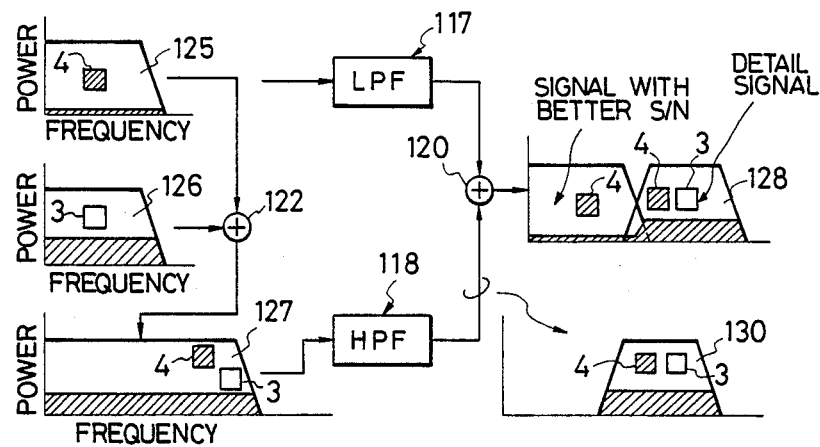
FIG. 19 shows the outline of the operation of a signal process circuit used in place of an adder 19 used in FIG. 11.
Figure 20:
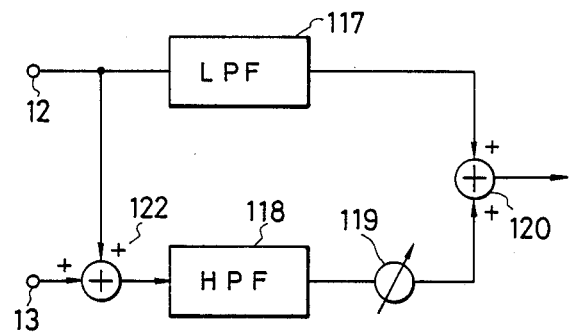
FIG. 20 shows a definite example of the signal process circuit for accomplishing the operation shown in FIG. 19.

FIG. 19 shows the circuit operation and FIG. 20, the detail of its process circuit.

In FIG. 20, reference numerals 125, 126 and 127 show the signal spectra of the signal storage pixel 4, the monitor pixel 3 and all the pixels, respectively. Hatched portion represents noise contained in the signal. Noise is less in the signal of the signal storage pixel 4 and hence, S/N is high. However, noise is great in the signal of the monitor pixel 3. The addition signal obtained by adding these two kinds of signals by the adder 112 has lower S/N than that of the signal using only the storage pixel 4 but since the number of pixels is twice, the signal spectrum has a wider band (higher resolution). This wide band signal 127 is passed through a high-pass filter (HPF) 118 to obtain a higher frequency component, while a narrow band signal 125 of the signal storage pixel 4 is passed through a low-pass filter (LPF) 117 to obtain a low band signal. When these signals are added by an adder 120, a wide band video signal 128 having high S/N can be obtained.

In FIG. 20, reference numeral 122 represents an adder which produces a wide band signal from the signal storage pixel 4 and the monitor pixel 3 and reference numeral 117 represents a low-pass filter which extracts a low band signal having high S/N. The high-pass filter 118 produces a high frequency signal in cooperation with a signal level controller 119. The adder 120 synthesizes the video signal 121 from these two signals.

FIGS. 21(A) through (E) show other examples of disposition of the monitor pixel 3 and the signal storage pixel 4. In some of these examples, the monitor pixels 3 and the signal storage pixels 4 need only be disposed on the same imaging area. Therefore, they may be disposed in such a manner as to be deviated from one another or may be aligned with one another. The manners of disposition can be applied not only to a single chip type but also to a multi-chip type.

Figure 21A:
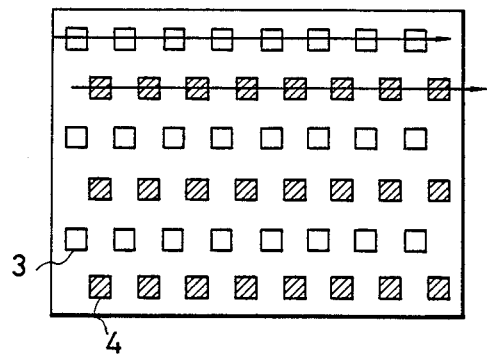
FIGS. 21A–21E show examples of disposition of monitor pixels 3 and signal storage pixels 4.
Figure 21B:
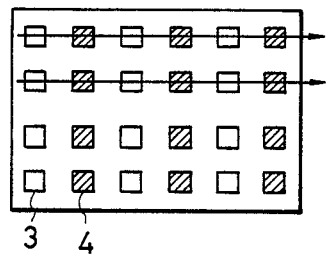
Figure 21C:
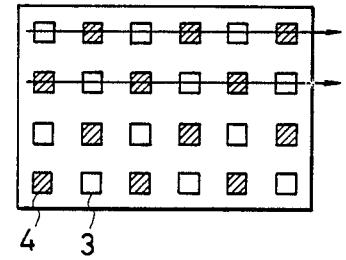
Figure 21E:
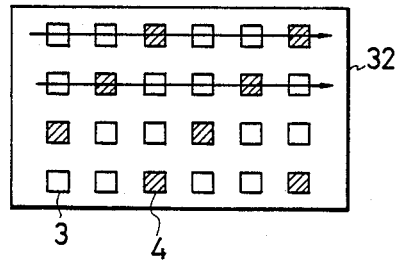
Figure 21D:
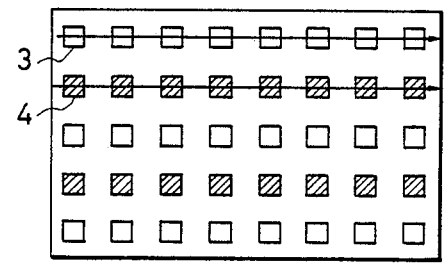

Incidentally, the proportion of the monitor pixels 3 to the signal storage pixels 4 is 1:1 in the examples shown in FIGS. 21(A) to (D), but the proportion may be arbitrary. FIG. 21(E) shows an example where the proportion is changed.

It is possible to divide the imaging area into a plurality of small regions, to detect motion from the signal from the monitor pixels in the individual regions and to carry out signal processing so as to obtain optimum dynamic resolution and S/N.

An object on a television camera seldom moves throughout the imaging area as a whole but in most cases, still portions and moving portions exist in mixture. Therefore, a signal having a short signal storage time is used in the block (dynamic block) containing objects having motion while a signal having a long signal storage time is used in the block (still block) containing only still objects. In this manner, only those signals which provide high picture quality are selected from signals having different storage time for each block.

FIG. 22 explains the signal processing method for each block. In the drawing, the imaging area is divided into four (first, second, third and fourth) blocks. FIG. 22(A) represents a signal having a short storage time which is read out after detecting motion and FIG. 22(B) shows a signal having a long storage time in the field memory. It will be now assumed that the motion of the object is detected in the first and fourth blocks. In this case, the signals of the first and fourth blocks in FIG. 22(A) and the signals of the second and third blocks in FIG. 22(B) are selected to constitute a picture such as shown in FIG. 22(C).

Figure 23:
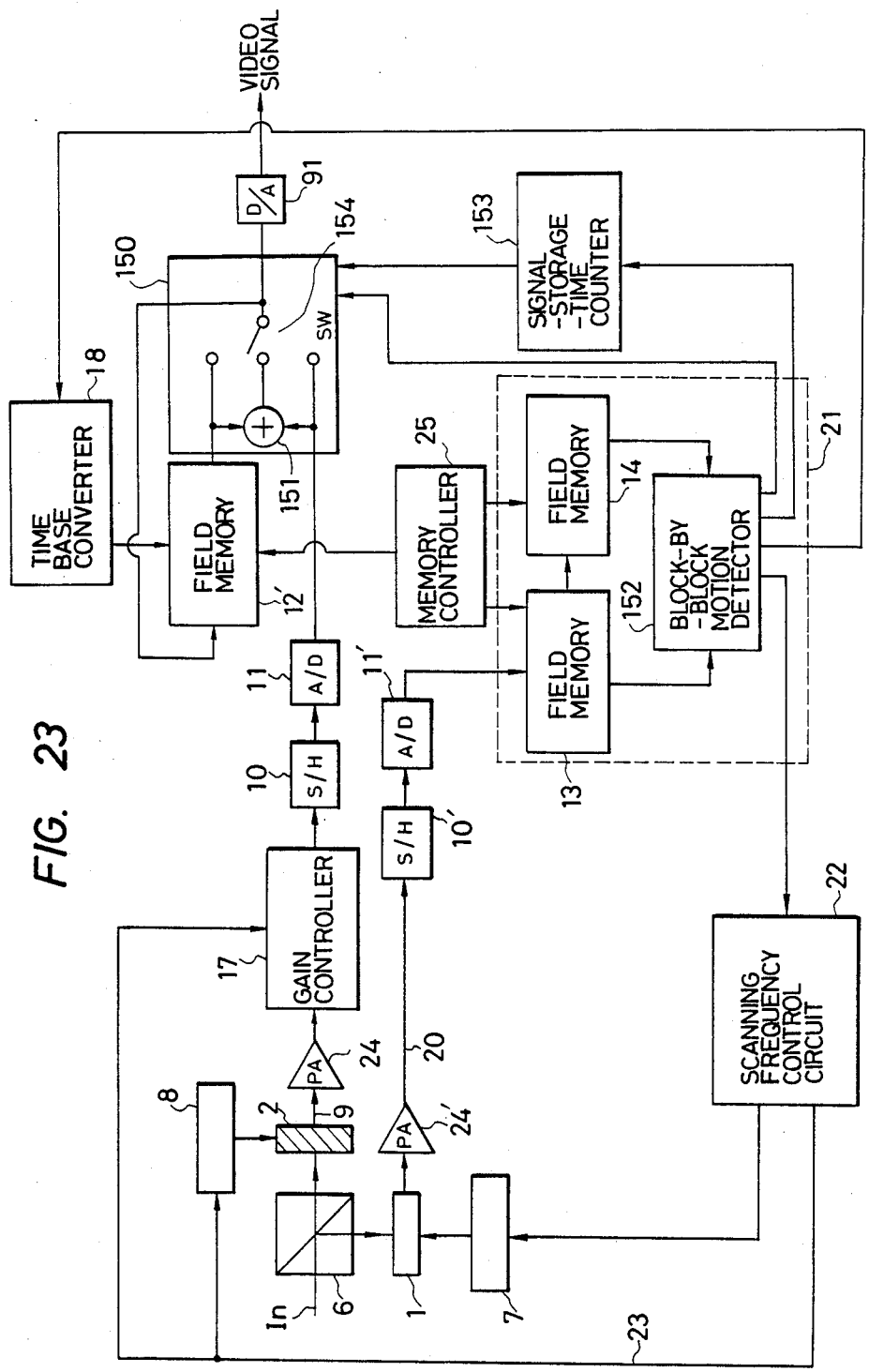
FIG. 23 is a block diagram showing a definite example of a television camera for processing signals for each block.

FIG. 23 is a block diagram showing a definite example of a television camera which makes it possible to carry out signal processing described above. The difference of this television camera from the camera shown in FIG. 2 lies in that this embodiment includes a motion detector 152 for detecting the motion for each block, a signal process circuit 150 and a signal-storage-time counter 153. The signal storage pixel 4 in this embodiment effects signal storage for the period of several fields or for the period of some dozens of fields for the still object to obtain a signal having high S/N. When the motion of the object is detected, a signal having high dynamic resolution is obtained by signal storage for one field.

The signal process circuit 150 consists of an adder 151 which adds the input signal of the signal storage pixel 4 and the signal of the field memory 12', and a switch 154 which selects either of the output signal of the adder 151 and the two input signals. The switch 154 of this signal process circuit 150 operates in such a manner that while the signal storage pixel 4 stores the signal, it selects the signal of the field memory 12' throughout all the blocks. When the motion is detected, it is connected to the output of the signal storage pixel 4, the field memory 12' or the output of the adder 151 in accordance with the motion of the block. In other words, in the moving blocks, the switch is connected to the signal storage pixel 4 while in the still block, it selects the signal of the adder 151 or the signal of the field memory 12' in accordance with S/N. The selected signal is outputted as the video signal and at the same time, is written into the field memory 12'. Namely, the output content becomes the content of the memory to be used for processing for the next field.

Figure 24:
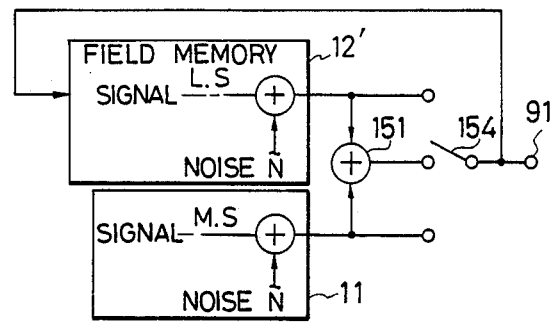
FIG. 24 shows equivalently signal readout from the signal storage pixels 4 and a field memory 12' shown in FIG. 23.

Next, the control method of the switch 154 will be described. FIG. 24 shows equivalently the signal readout operation from the signal storage pixel 4 and the field memory 12'. It will be assumed that the number of the signal storage fields of the field memory 12' is L, the number of the signal storage fields of the signal storage pixel 4 is M, the signal obtained in one-field period is S and noise is $\tilde{N}$. The signal of the field memory 12' is divided into L·S and $\tilde{N}$ the signal of the signal storage pixel 4 is divided into M·S and $\tilde{N}$ these noises are believed to add to the signal.

At this time, S/N of the addition signal (SN1) is given by the following formula (1):

$$SN1 = (L \cdot S + M \cdot S)/(\sqrt{2} \cdot \tilde{N}) \tag{1}$$

S/N (SN2) of the signal of the field memory is given by the following formula (2):

$$SN2 = (L \cdot S) \tag{2}$$

The following formula (4) can be obtained by solving inequality (3) as the condition in which S/N of the addition signal improves S/N of the field memory 12':

$$(L \cdot S + M \cdot S)/(\sqrt{2} \cdot \tilde{N}) > (L \cdot S)/\tilde{N} \tag{3}$$

with the proviso that when L>M, $$L > M > (\sqrt{2} - 1)L \tag{4}$$

Therefore, the switch selects the output of the adder when the condition corresponds to the conditional formula (4) and the signal of the field memory 12' in other cases. Incidentally, when M≧L, it is the case where S/N of the signal storage pixel is higher than that of the signal of the field memory 12', and the formula (6) is obtained by solving the inequality (5) to select either the signal of the adder 151 or the signal of the signal storage pixel 4.

$$(L \cdot S + M \cdot S)/(\sqrt{2} \cdot \tilde{N}) \geq (M \cdot S)/\tilde{N} \tag{5}$$

with the proviso that when M≧L, $$M \geq L \geq (\sqrt{2} - 1) \cdot M \tag{6}$$

The signal-storage-time counter 153 supervises the signal storage time (L, M) for each block, compares L with M and produces the control signal of the switch 154 to optimize S/N.

As described above, this invention carries out signal processing separately for the moving block and the still block to satisfy both the requirements for dynamic resolution and S/N. To accomplish this operation, the motion detector 152 detects motion for each block and supplies the signal for controlling the switch 154 to the signal process circuit 150. It supplies the scan start instruction to the scanning frequency control circuit 22 when the moving block is detected.

Figure 25:
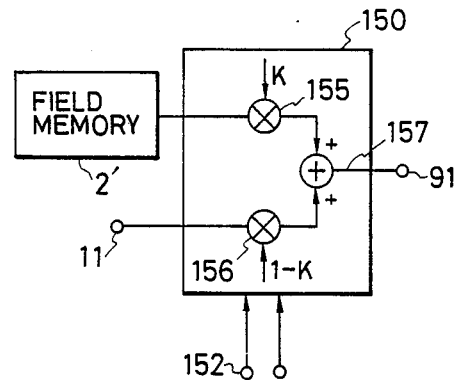
FIG. 25 shows another example of the signal process circuit 150 shown in FIG. 23.

FIG. 25 shows another example of the signal process circuit 150. In this circuit, the outputs of two gain controllers 155, 156 are added and outputted by the adder 157 instead of selecting the signals by the switch. The signal having various mix ratios can be obtained by controlling analogly the gains K and 1-K of the gain controllers 155 and 156. S/N of the object, which moves gently, can be improved drastically by controlling this K value with slight occurrence of obscurity of the picture.

The embodiment described above represents signal processing which makes control for each block by use of the signal read out and the memory signal, but it is also possible to control the storage time of the signal storage pixel 4 by disposing an independent scanning circuit for the individual region. If the signal storage time can be controlled for each block, S/N can be improved at the portion where any part of the picture is still without losing the dynamic resolution of the portions which are moving. Therefore, the television picture having excellent quality as a whole can be reproduced.

Figure 26A:
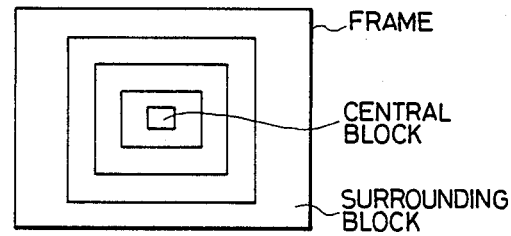
FIGS. 26A–26B show a divided example of the imaging area.
Figure 26B:
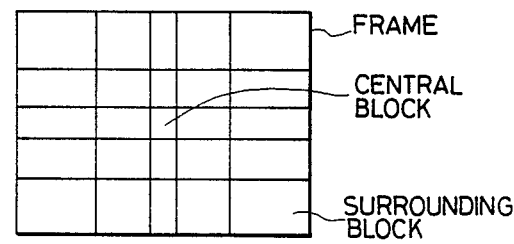

Though FIG. 22 shows the example wherein the imaging area is divided into four blocks, division may be made in such a manner as shown in FIGS. 26(A) and 26(B). In these drawings, the sizes of the blocks nearer to the center have progressively decreasing areas so that delicate control can be accomplished at the center of picture at which people are visually sensitive particularly. Therefore, picture quality can be further improved.

What is claimed is:

1. A solid-state television camera comprising:
a first group of photoelements for storing signal charges in accordance with the illuminance of an object;
a second group of photoelements for storing the signal charges in accordance with the illuminance of said object;
first scanning means for reading out the signal charges of said first group at a predetermined frequency;
second scanning means for reading out the signal charges of said second group at a predetermined frequency;
motion detection means for detecting motion of said object on the basis of the signal charges read out from said first group; and
frequency control means for controlling the frequency of said second scanning means on the basis of a signal from said motion detection means.

2. A solid-state television camera comprising:
a first group of photoelements for storing a signal charge in accordance with illuminance of an object;
a second group of photoelements for storing the signal charge in accordance with illuminance of said object;
motion detection means for detecting motion of said object on the basis of the signal from said first group; and
storage time control means for controlling the storage time of said second group on the basis of the signal from said motion detection means;
wherein said first and second groups are disposed on the same semiconductor substrate.

3. The solid-state television camera as defined in claim 1 which further includes color separation means for separating the image of said object into a plurality of color components, and wherein said first group stores the signal charges in accordance with at least one of said color components.

4. The solid-state television camera as defined in claim 2 wherein said first and second groups are arranged in a checkered pattern.

5. The solid-state television camera as defined in claim 2 wherein said motion detection means comprises detection means for detecting the difference signal between the present signal of the signals from said first group and the signal of one previous field, means for detecting an accumulation value of the absolute value of the output signal from said detection means and means for judging said object as a moving picture when the accumulation value is greater than a predetermined value and as a still picture when the accumulation value is smaller than the predetermined value, and outputting the result of detection.

6. The solid-state television camera as defined in claim 2 wherein only the signal of said second group is outputted as a video signal.

7. The solid-state television camera as defined in claim 2 wherein a synthetic signal of said first and second groups is outputted as the video signal.

8. The solid-state television camera as defined in claim 7 wherein said synthetic signal is obtained by adding the signals of said first and second groups are added by an adder.

9. The solid-state television camera as defined in claim 7 wherein said synthetic signal is an addition signal of the high frequency component of the signal obtained by adding the signals of said first and second and the low frequency component of said second group.

10. The solid-state television camera as defined in claim 1 which further includes illuminance detection means for detecting illuminance of said object on the basis of the signal charges read out from said first group, and wherein said frequency control means controls the frequency of said second scanning means on the basis of the signals of both of said motion detection means and said illuminance detection means.

11. A solid-state television camera comprising:
a first group of photoelements for storing signal charges in accordance with illuminance of an object;
a second group of photoelements for storing the signal charges in accordance with the illuminance of said object;
motion detection means for detecting motion of said object on the basis of the signal from said first group; and
storage time control means for controlling the storage time of said second group on the basis of a signal from said motion detection means;
wherein the signal from said second group is divided into a plurality of blocks, and signal processing is effected for each of said blocks, and said motion detection means includes first memory means for detecting motion of said object for each block and counting and storing the signal storage time for each block on the basis of the signal from said motion detection means, and signal processing means for receiving the signal from said second group and outputting the video signal in accordance with the signals from said motion detection means and said first memory means.

12. The solid-state television camera as defined in claim 11 wherein said signal processing means comprises second memory means for storing said video signal and means for selecting any one of the signal from said second memory means, the signal from said second group and a signal representing an addition of these signals, in accordance with the signals from said motion detection means and said first memory means, and for outputting said video signal.

13. The solid-state television camera as defined in claim 12 wherein said signal processing means comprises second memory means for storing said video signal, first gain control means for multiplying the signal from said second group by K, second gain control means for multiplying the signal from said second group by $(1-K)$ and addition means for adding the signals from said first and second gain control means and outputting said video signal, and said value K is controlled for each of said blocks in accordance with the signals from said motion detection means and said first memory means.

* * * * *